US 11,345,297 B2

(12) United States Patent
Nakamura et al.

(10) Patent No.: US 11,345,297 B2
(45) Date of Patent: May 31, 2022

(54) OCCUPANT MONITORING DEVICE FOR VEHICLE AND TRAFFIC SYSTEM

(71) Applicant: SUBARU CORPORATION, Tokyo (JP)

(72) Inventors: Ryota Nakamura, Tokyo (JP); Junpei Tokizaki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 197 days.

(21) Appl. No.: 16/739,348

(22) Filed: Jan. 10, 2020

(65) Prior Publication Data

US 2020/0290542 A1 Sep. 17, 2020

(30) Foreign Application Priority Data

Mar. 15, 2019 (JP) .............................. JP2019-049206

(51) Int. Cl.
*B60R 21/015* (2006.01)
*G06V 20/59* (2022.01)
*B60R 21/00* (2006.01)

(52) U.S. Cl.
CPC ........ *B60R 21/01538* (2014.10); *G06V 20/59* (2022.01); *B60R 2021/0027* (2013.01); *B60R 2021/0032* (2013.01)

(58) Field of Classification Search
CPC ...... B60R 21/01538; B60R 2021/0032; B60R 2021/0027; G06K 9/00832
See application file for complete search history.

(56) References Cited

U.S. PATENT DOCUMENTS

| 7,887,089 | B2 * | 2/2011 | Breed | B60R 21/01538 |
| | | | | 280/735 |
| 2010/0076646 | A1 * | 3/2010 | Basir | G07C 5/0891 |
| | | | | 701/32.2 |
| 2021/0009153 | A1 * | 1/2021 | Saito | B60W 50/14 |
| 2021/0236024 | A1 * | 8/2021 | Bono | G16H 10/60 |

FOREIGN PATENT DOCUMENTS

JP 2004-291761 A 10/2004
WO WO 2020/014795 A1 * 1/2020

* cited by examiner

*Primary Examiner* — Michael J Zanelli
(74) *Attorney, Agent, or Firm* — Troutman Pepper Hamilton Sanders LLP (57) ABSTRACT

An occupant monitoring device for a vehicle includes an image acquisition unit, a memory, a collision detector, and a controller. The image acquisition unit is configured to acquire a captured image of an occupant in the vehicle. The memory is configured to record the captured image acquired by the image acquisition unit. The collision detector is configured to detect collision of the vehicle. The controller is configured to control the image acquisition unit, the memory, and the collision detector. The controller is configured to detect each of consecutive collisions of the vehicle by the collision detector, acquire the captured image after each of the collisions by the image acquisition unit, and record the captured image acquired for each of the collisions on the memory.

19 Claims, 6 Drawing Sheets

OCCUPANT MONITORING DEVICE FOR VEHICLE AND TRAFFIC SYSTEM

CROSS-REFERENCE TO RELATED APPLICATIONS

The present application claims priority from Japanese Patent Application No. 2019-049206 filed on Mar. 15, 2019, the entire contents of which are hereby incorporated by reference.

BACKGROUND

The technology relates to an occupant monitoring device for a vehicle and to a traffic system.

A vehicle is provided with an occupant monitoring device in some cases.

The occupant monitoring device identifies an occupant in the vehicle. Depending on the identified occupant, for example, it is possible for the vehicle to permit or prohibit control of the vehicle.

SUMMARY

An aspect of the technology provides an occupant monitoring device for a vehicle. The occupant monitoring device includes an image acquisition unit, a memory, a collision detector, and a controller. The image acquisition unit is configured to acquire a captured image of an occupant in the vehicle. The memory is configured to record the captured image acquired by the image acquisition unit. The collision detector is configured to detect collision of the vehicle. The controller is configured to control the image acquisition unit, the memory, and the collision detector. The controller is configured to detect each of consecutive collisions of the vehicle by the collision detector, acquire the captured image after each of the collisions by the image acquisition unit, and record the captured image acquired for each of the collisions on the memory.

An aspect of the technology provides a traffic system including the occupant monitoring device for the vehicle and a communication device. The communication device is configured to communicate with the occupant monitoring device. The occupant monitoring device is configured to transmit, after the consecutive collisions of the vehicle, the captured image acquired for each of the collisions to the communication device.

An aspect of the technology provides an occupant monitoring device for a vehicle. The occupant monitoring device includes circuitry. The circuitry is configured to control a memory and a collision detector. The memory is configured to record a captured image of an occupant in the vehicle. The collision detector is configured to detect collision of the vehicle. The circuitry is further configured to detect each of consecutive collisions of the vehicle by the collision detector, acquire the captured image after each of the collisions, and record the captured image acquired for each of the collisions on the memory.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

In the following, some example embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

First Example Embodiment

Figure 1A:
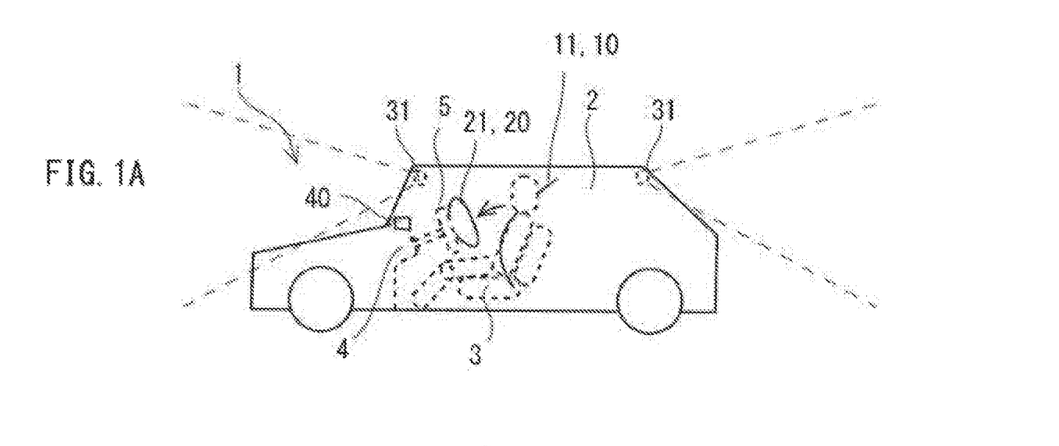
FIGS. 1A to 1C are schematic explanatory diagrams illustrating an automobile that is applicable to a traffic system according to one example embodiment of the technology.
Figure 1B:
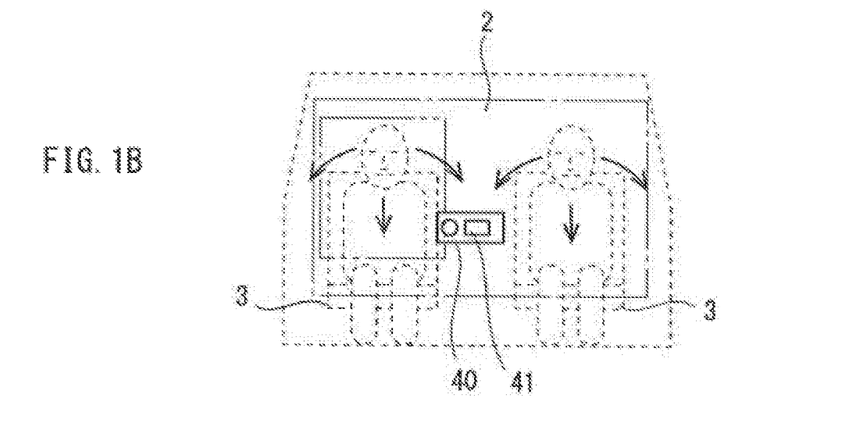
Figure 1C:
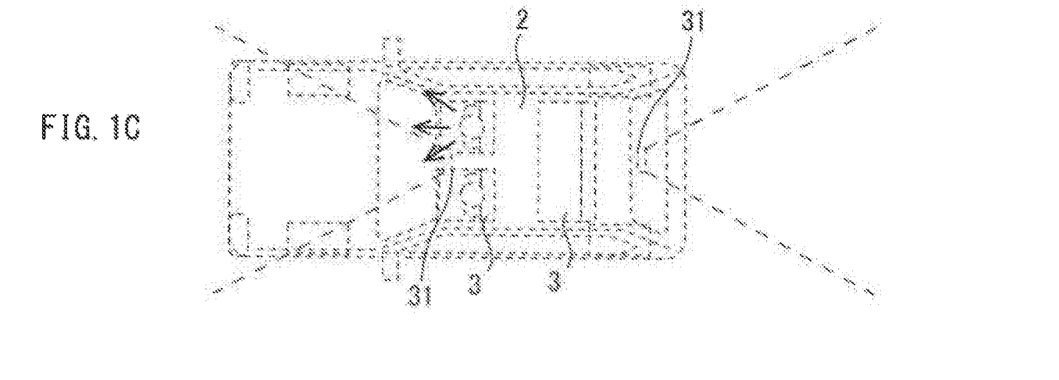

FIGS. 1A to 1C are schematic explanatory diagrams illustrating an automobile 1 that is applicable to a traffic system 80 according to a first example embodiment of the technology.

FIG. 1A is a side view, FIG. 1B is a cross-sectional view, and FIG. 1C is a top view.

The automobile 1 in FIGS. 1A to 1C is an example of a vehicle. The automobile 1 may include a cabin 2 that is provided in the middle of a body and allows an occupant to be on board. The cabin 2 may be provided with seats 3 in each of which the occupant may sit. The cabin 2 may be provided with a toe board 4 in a front part. On the front side of the seats 3, a steering wheel 5 may protrude rearward from the toe board 4. It is possible for the occupant to sit in the seat 3 and operate an operating member such as the steering wheel 5.

The automobile 1 may be provided with, to protect the occupant upon collision, occupant protection devices including a seatbelt device 10 and an airbag device 20.

The seatbelt device 10 may include a seatbelt 11 to be stretched over the occupant who is seated in the seat 3. The seatbelt device 10 may apply tension to the seatbelt 11 upon collision, and restrain the occupant to make it difficult for the occupant to come away from the seat 3.

The airbag device 20 may include an airbag 21 to be deployed on, for example, the front side or the right or left side of the seat 3. The airbag device 20 may deploy the airbag 21 upon collision, and support the occupant to prevent the occupant from falling or coming away from the seat 3.

In this manner, the automobile 1 is able to protect the occupant in the automobile 1 upon collision.

However, the automobile 1 does not only collide in a specific direction such as a front direction. As indicated by arrows in FIGS. 1A to 1C, the automobile 1 can collide also in an oblique direction, for example.

In a case of such special collision, the occupant protection devices can be unable to perfectly protect the occupant in the automobile 1.

Moreover, even if being able to reduce serious injuries of the occupant, the occupant protection devices are not necessarily able to reduce minor injuries of the occupant. The occupant protection devices do not guarantee prevention of injuries upon all kinds of collisions that are assumed for the automobile 1.

It is desired that the automobile 1 be further improved in protection performance for a person such as the occupant.

In the automobile 1, exterior cameras 31 may be provided to monitor directions such as the front direction serving as a traveling direction of the automobile 1. Analyzing captured images makes it possible to predict collision beforehand, and to automatically control the automobile 1 on the basis of the prediction.

In the automobile 1, an occupant monitoring device 40 may also be provided to monitor the occupant in the automobile 1. The occupant monitoring device 40 may also be referred to as a driver monitoring system (DMS). The occupant monitoring device 40 may be provided, for example, in the middle of a vehicle width direction at the top of the toe board 4, and may identify the occupant in the automobile 1. Depending on the identified occupant, it is possible for the automobile 1 to permit or prohibit traveling control of the automobile 1.

An image of an interior camera 41 of this occupant monitoring device 40 may be recorded and transmitted to the traffic system 80 as an emergency report. In this case, the automobile 1 is able to transmit, as the emergency report, occupant monitoring information acquired upon collision by the occupant monitoring device 40, without additionally including a reporting device dedicated for emergency reporting. It is possible to use the occupant monitoring device 40 provided in the automobile 1 for occupant rescue, for example.

However, collision of the automobile 1 can occur more than once. The automobile 1 involved in a collision can further collide with another automobile 82, for example.

In such a situation, in a case where the occupant monitoring device 40 is configured to perform monitoring and reporting on the basis of first collision detection, for example, the occupant monitoring device 40 can be unable to appropriately monitor and report a change in state of the occupant due to subsequent collisions.

It is desired that, upon collision, the occupant monitoring device 40 be able to appropriately monitor an occupant even if the collision includes a plurality of collisions.

Figure 2:
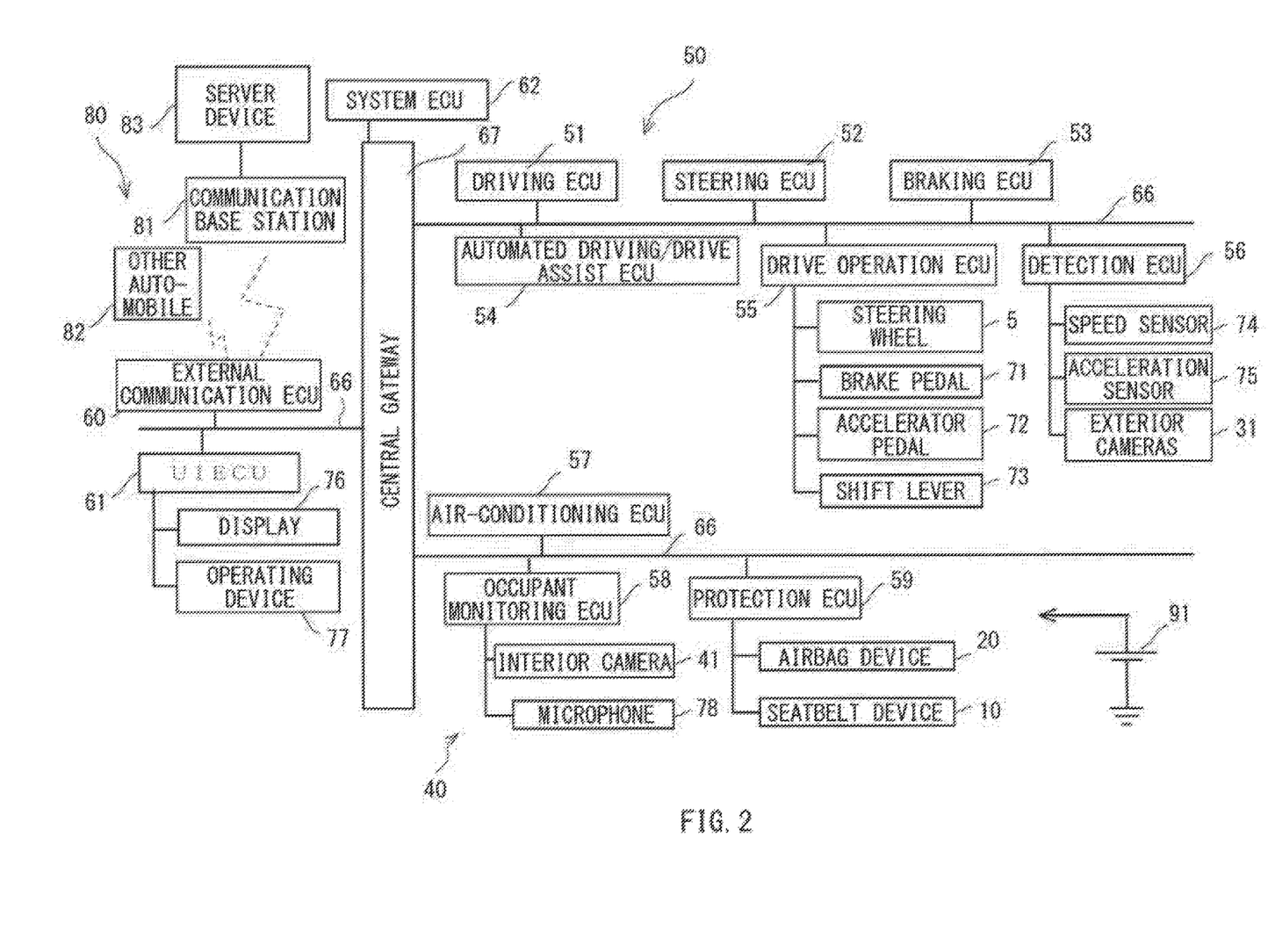
FIG. 2 is a schematic explanatory diagram illustrating a control system of the automobile illustrated in FIGS. 1A to 1C.

FIG. 2 is a schematic explanatory diagram illustrating a control system 50 of the automobile 1 illustrated in FIGS. 1A to 1C. FIG. 2 illustrates the occupant monitoring device 40 and other communication devices of the traffic system 80.

FIG. 2 also illustrates control electronic control units (ECUs) that are included in respective control modules. The control modules represented by the control ECUs may constitute the control system 50 of the automobile 1.

For example, FIG. 2 illustrates a driving ECU 51, a steering ECU 52, a braking ECU 53, an automated driving/drive assist ECU 54, a drive operation ECU 55, a detection ECU 56, an air-conditioning ECU 57, an occupant monitoring ECU 58, a protection ECU 59, an external communication ECU 60, a UIECU 61, and a system ECU 62. These control ECUs may be coupled to a central gateway (CGW) 67 serving as a relay via an in-vehicle network 66 that is adopted in the automobile 1. Examples of the in-vehicle network 66 may include a Controller Area Network (CAN) and a Local Interconnect Network (LIN).

In each control module, the control ECU may be coupled to an electronic apparatus that is used in the automobile 1. Being activated, the control ECU may perform various processes, and control operation of the electronic apparatus coupled to the control ECU, on the basis of information (data) acquired from the in-vehicle network 66. The control ECU may also output, to the in-vehicle network 66, information (data) such as an operation state of the electronic apparatus coupled to the control ECU.

For example, the drive operation ECU 55 may be coupled to operation detection sensors including the steering wheel 5, a brake pedal 71, an accelerator pedal 72, and a shift lever 73. The occupant may operate the operation detection sensors to control traveling of the automobile 1. The drive operation ECU 55 may output control information corresponding to amounts of operation to the in-vehicle network 66. The driving ECU 51, the steering ECU 52, and the braking ECU 53 may acquire information from the in-vehicle network 66, and control traveling of the automobile 1.

The detection ECU 56 may be coupled to elements including a speed sensor 74, an acceleration sensor 75, and the exterior cameras 31 described above of the automobile 1. The acceleration sensor 75 may detect an acceleration due to collision, for example. The detection ECU 56 may output, to the in-vehicle network 66, information such as values of the speed sensor 74 and the acceleration sensor 75 of the automobile 1 and images of the exterior cameras 31. The detection ECU 56 may predict collision on the basis of the images of the exterior cameras 31, and output a prediction result to the in-vehicle network 66. In a case where the acceleration of the acceleration sensor 75 is equal to or greater than a threshold that is higher than an acceleration during normal traveling, the detection ECU 56 may output collision detection to the in-vehicle network 66. For example, after collision with a pedestrian or a bicycle is predicted on the basis of the images of the exterior cameras 31, in a case where the acceleration of the acceleration sensor 75 is equal to or greater than a threshold that is higher than a normal acceleration, the detection ECU 56 may output detection of collision with a pedestrian to the in-vehicle network 66.

In one embodiment, the detection ECU 56 may serve as a "collision detector".

The central gateway 67 may relay information. The UIECU 61 may acquire information from the in-vehicle network 66, and display the information on a display 76 coupled to the UIECU 61. The UIECU 61 may be coupled to, as well as the display 76, an operating device 77 to be operated by the occupant.

The occupant monitoring ECU 58 may be coupled to the interior camera 41 described above and a microphone 78. The occupant monitoring ECU 58 may be a control ECU of the occupant monitoring device 40. The occupant monitoring ECU 58 may perform various processes related to the occupant in the automobile 1, depending on information such as the image of the interior camera 41, sound of the microphone 78, and an acceleration of impact, for example, acquired from the in-vehicle network 66. The occupant monitoring ECU 58 may output an image, sound, and other information (data) to the in-vehicle network 66 as necessary.

In one embodiment, the occupant monitoring ECU 58 may serve as an "image acquisition unit".

The protection ECU 59 may be coupled to the airbag device 20 and the seatbelt device 10, which are described above. The protection ECU 59 may control operation of the airbag device 20 and the seatbelt device 10, on the basis of information acquired from the in-vehicle network 66.

The external communication ECU 60 may wirelessly communicate with, for example, a communication base station 81 and a communication device of the other automobile 82 that are present outside the automobile 1. The traffic system 80 may include the communication base station 81, the communication device of the other automobile 82, and a server device 83. The external communication ECU 60 may wirelessly transmit information acquired from the in-vehicle network 66 to the communication base station 81 and the communication device of the other automobile 82. The transmitted information may be used in the server device 83 or the other automobile 82, for example. The external communication ECU 60 may also receive information from the communication base station 81 and the communication device of the other automobile 82, and output the received information to the in-vehicle network 66. This enables the occupant monitoring ECU 58, for example, of the automobile 1 to transmit and receive information (data), via the external communication ECU 60, to/from the server device 83 or the other automobile 82 outside the automobile 1.

The control system 50 illustrated in FIG. 2 may operate by each unit being supplied with electric power from a battery 91 that is provided in the automobile 1. Electric power supply lines from the battery 91 to each unit may run throughout the automobile 1, together with communication cables of the in-vehicle network 66, for example. The control system 50 may be supplied with electric power from an electric power generator and an electric power receiver, in addition to the battery 91.

Figure 3:
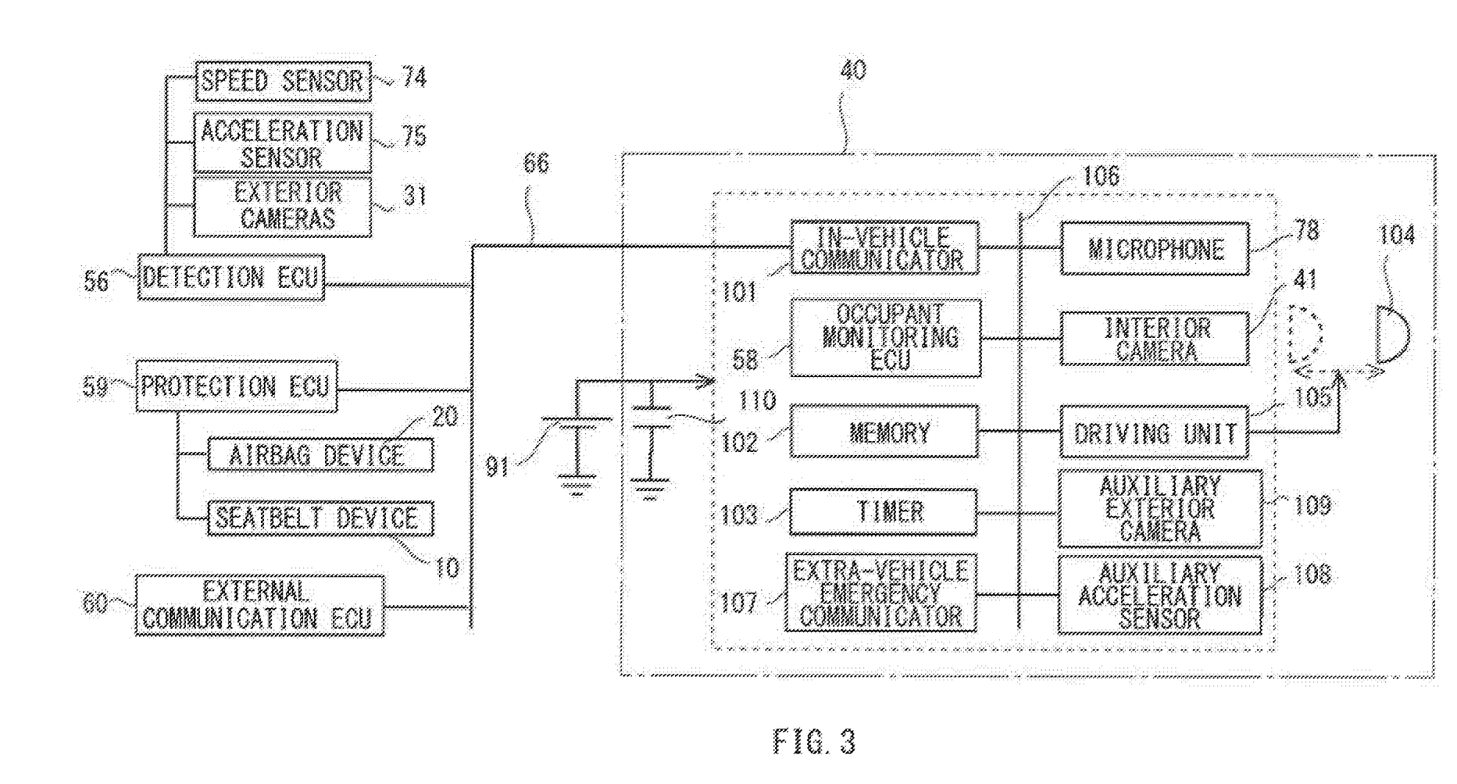
FIG. 3 is a block diagram illustrating an occupant monitoring device that includes an occupant monitoring ECU illustrated in FIG. 2.

FIG. 3 is a block diagram illustrating the occupant monitoring device 40 that includes the occupant monitoring ECU 58 illustrated in FIG. 2.

The occupant monitoring device 40 in FIG. 3 may include an in-vehicle communicator 101, the occupant monitoring ECU 58, a memory 102, a timer 103, the microphone 78, the interior camera 41, a driving unit 105 of a lens 104, and an internal bus 106 that couple these elements. In addition to these elements, the occupant monitoring device 40 may independently include, for example, elements including an extra-vehicle emergency communicator 107, an auxiliary acceleration sensor 108, and an auxiliary exterior camera 109 that are coupled to the internal bus 106. The auxiliary exterior camera 109 may be configured to capture an image of a pedestrian, for example. This enables the occupant monitoring device 40 to independently perform a process upon collision.

Each unit of the occupant monitoring device 40 may be supplied with electric power from the battery 91 of the automobile 1. A path of the electric power supply may be coupled to a storage battery 110 that stores backup electric power. The occupant monitoring device 40 may be provided to be detachable from the automobile 1.

The in-vehicle communicator 101 may be coupled to the in-vehicle network 66. As illustrated in the drawing, for example, the in-vehicle communicator 101 may transmit and receive, via the in-vehicle network 66, information (data) to/from other control ECUs such as the detection ECU 56, the protection ECU 59, and the external communication ECU 60.

In one embodiment, the in-vehicle communicator 101 may serve as a "communicator".

The interior camera 41 may be an imaging device that captures an image of the cabin 2 of the automobile 1.

The driving unit 105 may drive the lens 104, and control a position of the lens 104. Controlling the position of the lens 104 causes an angle of view of the interior camera 41 to change. If the lens 104 is controlled to a farthest position, the interior camera 41 may capture an image of an upper body including the head of the occupant serving as a driver, as indicated by a chain double-dashed line frame in FIG. 1B, for example. The occupant serving as the driver may be seated in the seat 3 to operate the steering wheel 5, for example. If the lens 104 is controlled to a nearest position, the interior camera 41 may capture an image of the whole of the cabin 2, as indicated by a chain line frame in FIG. 1B, for example. In this case, it is possible for the interior camera 41 to capture an image of, in addition to the occupant serving as the driver, another occupant who is seated in the seat 3 at a passenger seat or rear seats.

The microphone 78 may convert sound of the cabin 2 of the automobile 1 into an electrical signal.

The timer 103 may measure elapsed time or a time.

The extra-vehicle emergency communicator 107 may be a communication device that is able to communicate with the communication base station 81 or the other automobile 82 outside the automobile 1 in, for example, an emergency such as an automobile accident. The extra-vehicle emergency communicator 107 may communicate with the communication base station 81 or the other automobile 82 by the same communication method as that used by the external communication ECU 60.

Like the acceleration sensor 75, the auxiliary acceleration sensor 108 may detect an acceleration that acts on the automobile 1.

The memory 102 may record various information, such as images and detection values, acquired by the occupant monitoring device 40. The memory 102 may also record a program for occupant monitoring.

The occupant monitoring ECU 58 may read the program for occupant monitoring from the memory 102 and perform the program. Thus, the occupant monitoring ECU 58 may serve as a controller of the occupant monitoring device 40. The controller of the occupant monitoring device 40 may control overall operation of the occupant monitoring device 40, enabling the occupant monitoring device 40 to achieve occupant monitoring.

The occupant monitoring may include, for example, a function of identifying the occupant who goes on board, a function of monitoring a state of the occupant in the automobile 1, a function of detecting a gesture operation by the occupant, and a function of reporting an emergency upon collision.

Now, an emergency reporting process upon collision in the example embodiment will be described.

Figure 4:
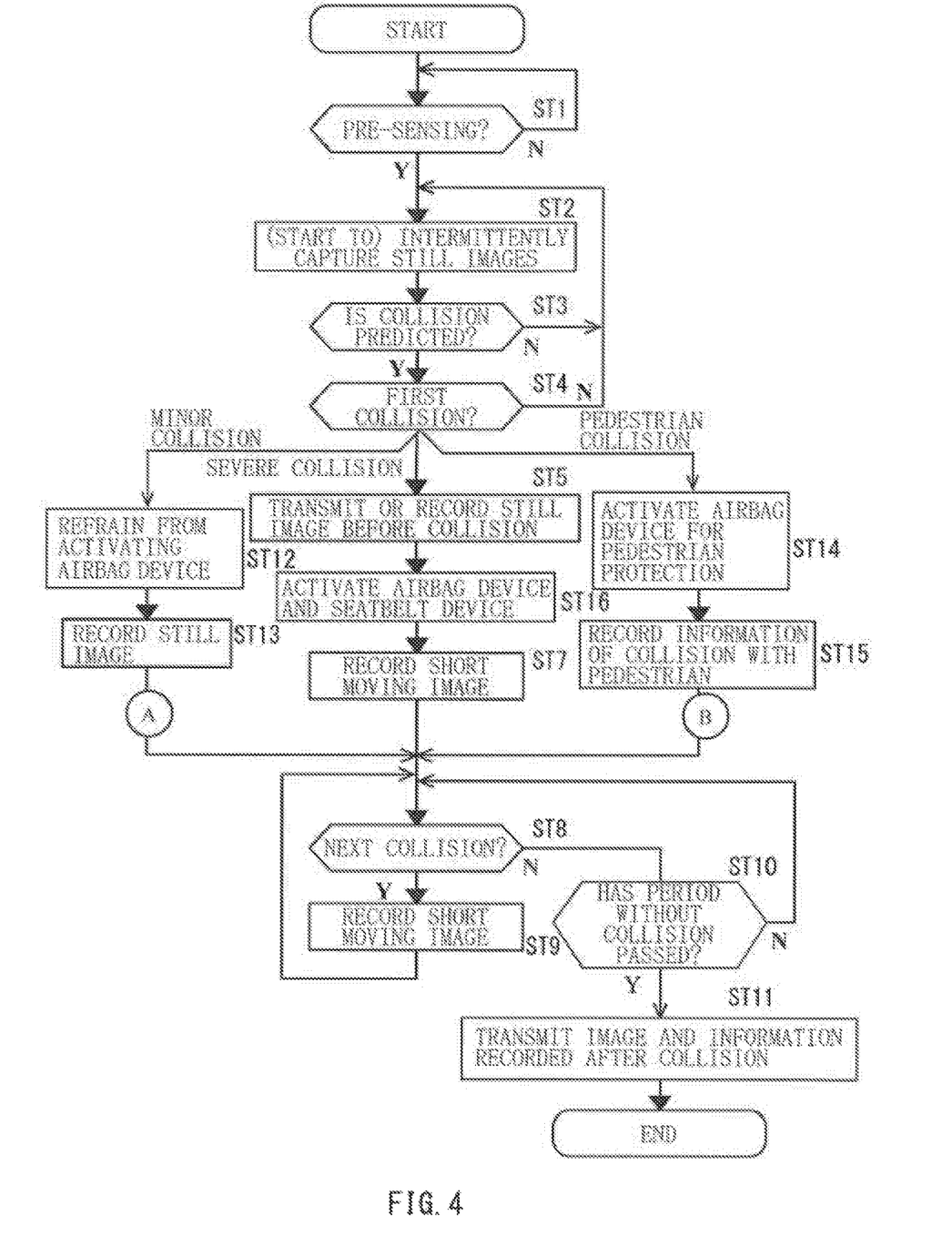
FIG. 4 is a flowchart illustrating a flow of a process upon collision to be performed by the occupant monitoring ECU illustrated in FIG. 3.

FIG. 4 is a flowchart illustrating a flow of a process upon collision to be performed by the occupant monitoring ECU 58 illustrated in FIG. 3. The occupant monitoring ECU 58 may repeatedly perform the process upon collision illustrated in FIG. 4 while the occupant is in the automobile 1.

In step ST1 in FIG. 4, the occupant monitoring ECU 58 may check setting of pre-sensing of predicting collision before collision detection. In a case where pre-sensing is not set (ST1: N), the occupant monitoring ECU 58 may repeat the process in step ST1 and wait for pre-sensing to be set. In a case where pre-sensing is set (ST1: Y), the occupant monitoring ECU 58 may advance the process to step ST2.

In step ST2, the occupant monitoring ECU 58 may start to capture still images by the interior camera 41 provided in the occupant monitoring device 40. The interior camera 41 may intermittently repeat capturing of still images.

In step ST3, the occupant monitoring ECU 58 may determine whether collision is predicted. For example, the occupant monitoring ECU 58 may acquire, from the in-vehicle communicator 101, collision prediction that has been outputted to the in-vehicle network 66 by the detection ECU 56, and determine whether collision is predicted. In another example, the external communication ECU 60 may receive information of collision ahead from the other automobile 82 or the communication base station 81, for example, and output the information of collision ahead to the in-vehicle network 66. In this case, the occupant monitoring ECU 58 may acquire the information of collision ahead, and determine whether collision is predicted. In a case where no collision is predicted (ST3: N), the occupant monitoring ECU 58 may return the process to step ST2. In a case where collision is predicted (ST3: Y), the occupant monitoring ECU 58 may advance the process to step ST4.

It is to be noted that, in the case where collision is predicted, the occupant monitoring ECU 58 may, for example, instruct the driving unit 105 to switch an angle of view, to switch an image captured by the interior camera 41 from an image of only the driver to an image of the whole of the cabin 2, and thereafter advance the process to step ST4.

In step ST4, the occupant monitoring ECU 58 may acquire an acceleration that acts on the automobile 1 due to collision, and determine presence or absence of a first collision. For example, the occupant monitoring ECU 58 may acquire, from the in-vehicle communicator 101, collision detection that has been outputted to the in-vehicle network 66 by the detection ECU 56, and determine presence or absence of the first collision. In a case where the acceleration of the auxiliary acceleration sensor 108 is equal to or greater than a collision presence/absence threshold that is higher than an acceleration during normal traveling, the occupant monitoring ECU 58 may determine that collision is detected. In a case where no collision is detected (ST4: N), the occupant monitoring ECU 58 may return the process to step ST2.

In a case where collision is detected, the occupant monitoring ECU 58 may determine a status of the collision, depending on the collision prediction and detection of an acceleration, for example, of the collision. For example, in a case where the acceleration is greater than a collision level determination threshold, the occupant monitoring ECU 58 may determine that the collision is a severe collision, and advance the process to step ST5. In a case where the acceleration is equal to or less than the determination threshold, the occupant monitoring ECU 58 may determine that the collision is a minor collision, and advance the process to step ST12. In a case where a collision with a pedestrian has been predicted in the collision prediction, the occupant monitoring ECU 58 may determine that the collision is a collision with a pedestrian, and advance the process to step ST14.

In step ST5 where the first collision is a severe collision, the occupant monitoring ECU 58 may acquire a still image captured by the interior camera 41 before the collision. The occupant monitoring ECU 58 may save the acquired still image before collision to the memory 102 to allow for transmission. This enables the occupant monitoring ECU 58 to record, after the first collision, the still image before the first collision to allow for transmission. The occupant monitoring ECU 58 may also output the still image before collision from the in-vehicle communicator 101 to the in-vehicle network 66. The external communication ECU 60 may acquire the still image before collision from the in-vehicle network 66, and transmit the still image before collision to the traffic system 80. By receiving this, it is possible for the server device 83 and the other automobile 82 of the traffic system 80 to detect that the automobile 1 has collided.

It is to be noted that, in a case of attempting to transmit an image, for example, the occupant monitoring ECU 58 may attempt to transmit other information in addition to the image. For example, information effective at specifying a vehicle from the outside of the automobile 1 may be registered in advance in the memory 102. The information may include a manufacturer, a vehicle type, a body color, and equipment of the vehicle. In this case, the occupant monitoring ECU 58 may attempt to transmit such vehicle specific information together with the image.

In step ST6, the occupant monitoring ECU 58 may output an instruction to deploy the airbag 21 from the in-vehicle communicator 101 to the in-vehicle network 66, depending on, for example, an input direction of impact due to the collision and a seating state of the occupant before the collision. The protection ECU 59 may acquire the instruction to deploy the airbag 21 from the in-vehicle network 66, and activate the airbag device 20 and the seatbelt device 10. This enables the airbag device 20 and the seatbelt device 10 to protect the occupant from the assumed collision.

In step ST7, the occupant monitoring ECU 58 may acquire, from the activated interior camera 41 or memory 102, a captured moving image of the occupant in the automobile 1. The occupant monitoring ECU 58 may acquire, from the interior camera 41 or the memory 102, a short moving image within a predetermined time range before and after input timing of the impact. The occupant monitoring ECU 58 may record the acquired short moving image after the collision on the memory 102 to allow for transmission. The occupant monitoring ECU 58 may advance the process to step ST8.

In step ST12 where the first collision is a minor collision, the occupant monitoring ECU 58 may refrain from outputting the instruction to deploy the airbag 21. In other words, the protection ECU 59 may refrain from activating the airbag device 20.

In step ST13, the occupant monitoring ECU 58 may acquire a still image after the collision from the activated interior camera 41 or memory 102. The occupant monitoring ECU 58 may record the acquired still image after the collision on the memory 102 to allow for transmission. The occupant monitoring ECU 58 may advance the process to step ST8.

In step ST14 where the first collision is a collision with a pedestrian, the occupant monitoring ECU 58 may output an instruction to deploy the airbag 21 for pedestrian protection from the in-vehicle communicator 101 to the in-vehicle network 66. The airbag 21 for pedestrian protection may be located, for example, near a position where the impact is inputted. The protection ECU 59 may acquire, from the in-vehicle network 66, the instruction to deploy the airbag 21 for pedestrian protection, and activate the airbag device 20 for pedestrian protection. This makes it possible to protect a pedestrian or a bicycle from collision with the automobile 1.

In step ST15, instead of acquiring an image from the activated interior camera 41 or memory 102, the occupant monitoring ECU 58 may record information of the collision with the pedestrian on the memory 102 to allow for transmission. The occupant monitoring ECU 58 may advance the process to step ST8.

In step ST8 where the process upon the first collision has been performed, the occupant monitoring ECU 58 may determine presence or absence of a second or subsequent collision. For example, the occupant monitoring ECU 58 may acquire, from the in-vehicle communicator 101, collision detection that has been outputted to the in-vehicle network 66 by the detection ECU 56, and determine presence or absence of the second or subsequent collision. In a case where the acceleration of the auxiliary acceleration sensor 108 is equal to or greater than a collision presence/absence threshold that is higher than an acceleration during normal traveling, the occupant monitoring ECU 58 may determine that the second or subsequent collision is detected. In a case where the second or subsequent collision is detected (ST8: Y), the occupant monitoring ECU 58 may advance the process to step ST9. In a case where no collision is newly detected (ST8: N), the occupant monitoring ECU 58 may advance the process to step ST10.

In step ST9, the occupant monitoring ECU 58 may acquire a moving image from the activated interior camera 41 or memory 102. The occupant monitoring ECU 58 may acquire, from the interior camera 41 or the memory 102, a short moving image within a predetermined time range before and after input timing of the impact. The time range may be after the time range of the previously recorded short moving image. The occupant monitoring ECU 58 may record the acquired short moving image after the collision on the memory 102 to allow for transmission. Thus, for consecutive collisions, the occupant monitoring ECU 58 is able to acquire an image for each collision during the consecutive collisions, and record the image on the memory 102 to allow for transmission. Each time a severe collision, for example, is detected out of the consecutive collisions, the occupant monitoring ECU 58 may repeatedly record a moving image in a predetermined period on the memory 102 to allow for transmission. Thereafter, the occupant monitoring ECU 58 may return the process to step ST8.

In step ST10, the occupant monitoring ECU 58 may determine whether a predetermined period without collision has passed. The timer 103 may measure the predetermined period without collision from timing of the last collision. In a case where the predetermined period without collision has not passed (ST10: N), the occupant monitoring ECU 58 may return the process to step ST8. In a case where the predetermined period without collision has passed (ST10: Y), the occupant monitoring ECU 58 may advance the process to step ST11.

In step ST11, the occupant monitoring ECU 58 may output, from the in-vehicle communicator 101 to the in-vehicle network 66, images and information that have been recorded to be accumulated on the memory 102 after collisions. The external communication ECU 60 may acquire an image after collision, for example, from the in-vehicle network 66, and transmit the image after collision to the traffic system 80. The occupant monitoring ECU 58 may attempt to transmit vehicle specific information together with the image. After consecutive collisions of the automobile 1, the occupant monitoring ECU 58 may attempt to output an image acquired for each collision to the in-vehicle communicator 101 that communicates with the outside of the automobile 1. By receiving information from the in-vehicle communicator 101, it is possible for the server device 83 and the other automobile 82 of the traffic system 80 to sense a state after collision of the automobile 1. The server device 83 and the other automobile 82 may serve as the other communication devices that communicate with the external communication ECU 60 in the traffic system 80. It is possible for the server device 83 and the other automobile 82 to acquire, after consecutive collisions of the automobile 1, an image or information acquired for each collision as an emergency report. Thereafter, the occupant monitoring ECU 58 may terminate the process in FIG. 4.

As described above, in the example embodiment, the occupant monitoring ECU 58 of the occupant monitoring device 40 of the automobile 1 may acquire accelerations due to consecutive collisions of the automobile 1, for each collision. The occupant monitoring ECU 58 may acquire an image after each collision as the image acquisition unit, and record the image acquired for each collision on the memory 102 to allow for transmission. After the consecutive collisions of the automobile 1, the occupant monitoring ECU 58 may attempt to output the image acquired for each collision to the communicator that communicates with the outside of the automobile 1. Thus, after the collisions, images recorded on the memory 102 or transmitted images may be automatically transmitted to be used for occupant rescue, for example. For example, in the example embodiment, for consecutive collisions of the automobile 1, an image after each collision may be recorded, making it possible to know a change in state of the occupant due to the consecutive collisions. In addition, after a first collision, the occupant monitoring ECU 58 may record a still image before the first collision to allow for transmission, making it possible to also know a state of the occupant before collision. This makes it possible to appropriately know a change in state of the occupant due to subsequent collisions. In a case where consecutive collisions have occurred among a plurality of automobiles 1, it is possible to know a change in state of the occupant in each of the automobiles 1. Thus, even for an occupant suffering combined damage due to the consecutive collisions, it is possible for a state of the occupant to be known more accurately and used for rescue of a plurality of occupants, for example.

In the example embodiment, each time a severe collision is detected out of consecutive collisions, the occupant monitoring ECU 58 may repeatedly record a moving image in a predetermined period on the memory 102 to allow for transmission. Thus, for consecutive collisions whose duration is unknown, it is possible to appropriately record moving images during the collisions on the memory 102 to allow for transmission. In contrast, if, for consecutive collisions whose duration is unknown, a moving image is simply started from a first collision, for example, it is difficult to decide timing to terminate recording. In that case, recording of the moving image will continue even after the end of the consecutive collisions. It is difficult to appropriately terminate recording of the moving image for the consecutive collisions whose duration is unknown. Consequently, the occupant monitoring device 40 can uselessly consume electric power after the collisions, for example, for recording of the moving image. It is also difficult to decide timing to transmit the recorded moving image early and appropriately. In the example embodiment, such a matter is prevented or suppressed, because recording of a moving image may be terminated in a predetermined short period. For image data recorded on the memory 102, termination information of the image data may be recorded normally.

For example, in the example embodiment, at a first collision out of consecutive collisions, the occupant monitoring ECU 58 may record a moving image, a still image, or collision information on the memory 102, depending on a status of the collision. At a second collision out of the consecutive collisions, the occupant monitoring ECU 58 may record a moving image on the memory 102, regardless of the status of the collision. Thus, each time a severe collision, for example, is detected out of the consecutive collisions, the occupant monitoring ECU 58 is able to repeatedly record a moving image in a predetermined period on the memory 102 to allow for transmission. Moreover, in a case of a collision other than a severe collision, an amount of recorded data may be reduced by recording a still image or information of a collision with a pedestrian.

Accordingly, in the traffic system 80 that has received an emergency report, it is possible to easily determine a cause of the consecutive collisions by using the first image recorded or transmitted for the collisions. For the second or subsequent collision, a moving image may be recorded on the memory 102 regardless of the status of the collision. This makes it possible to consecutively know a detailed situation for the subsequent collisions.

For example, in a case where images are recorded in the order of "a still image, a moving image, a moving image", it is possible to intuitively and easily know that severe collisions have consecutively occurred after a minor collision by only checking the images, without additionally checking other information such as accelerations. Even in a case where many automobiles 1 have caused collisions, it is possible to easily know statuses of the collisions in each of the automobiles 1. This enables a rescuer, for example, to easily determine, after collision, influence of the collision that is difficult to determine from appearance after the collision.

Second Example Embodiment

Now, the traffic system 80 according to a second example embodiment of the technology will be described. In the second example embodiment, a second or subsequent process upon collision may differ depending on a status of a first collision. The following description mainly describes differences from the first example embodiment described above. In the second example embodiment, elements that are similar to those in the first example embodiment described above are denoted with the same numerals to avoid any redundant description.

Figure 5:
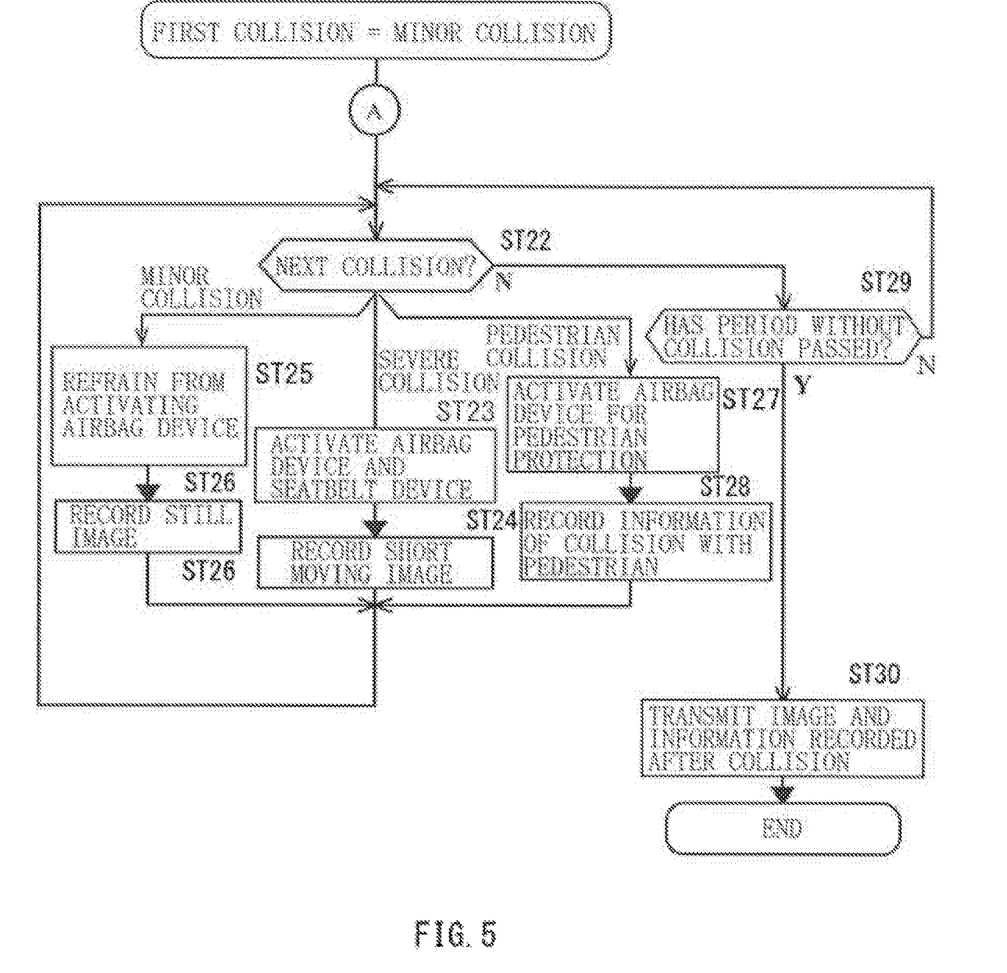
FIG. 5 is a flowchart illustrating a flow of a second or subsequent process upon collision to be performed subsequently to a node A after a first minor collision process illustrated in FIG. 4 in one example embodiment of the technology.

FIG. 5 is a flowchart illustrating a flow of a second or subsequent process upon collision to be performed subsequently to a node A after a first minor collision process illustrated in FIG. 4 in the second example embodiment of the technology.

In step ST22 after the first minor collision process, the occupant monitoring ECU 58 may acquire an acceleration that acts on the automobile 1, and determine presence or absence of a second or subsequent collision. In a case where no collision is detected (ST22: N), the occupant monitoring ECU 58 may advance the process to step ST29. In a case where collision is detected, the occupant monitoring ECU 58 may determine a status of the collision on the basis of detection of an acceleration, for example, of the collision, and advance the process. For example, in a case where the acceleration is greater than a collision level determination threshold, the occupant monitoring ECU 58 may determine that the collision is a severe collision, and advance the process to step ST23. In a case where the acceleration is equal to or less than the determination threshold, the occupant monitoring ECU 58 may determine that the collision is a minor collision, and advance the process to step ST25. In a case where a collision with a pedestrian is predictable from images of the exterior cameras 31 before the collision, the occupant monitoring ECU 58 may determine that the collision is a collision with a pedestrian, and advance the process to step ST27.

In step ST23 where the collision is a severe collision, the occupant monitoring ECU 58 may output an instruction to deploy the airbag 21 from the in-vehicle communicator 101 to the in-vehicle network 66, depending on, for example, an input direction of impact due to the collision and a seating state of the occupant before the collision. The protection ECU 59 may acquire the instruction to deploy the airbag 21 from the in-vehicle network 66, and activate the airbag device 20 and the seatbelt device 10. This enables the airbag device 20 and the seatbelt device 10 to protect the occupant from the assumed collision.

In step ST24, the occupant monitoring ECU 58 may acquire, from the activated interior camera 41 or memory 102, a captured moving image of the occupant in the automobile 1. The occupant monitoring ECU 58 may acquire, from the interior camera 41 or the memory 102, a short moving image within a predetermined time range before and after input timing of the impact. The occupant monitoring ECU 58 may record the acquired short moving image after the collision on the memory 102 to allow for transmission. The occupant monitoring ECU 58 may return the process to step ST22.

In step ST25 where the collision is a minor collision, the occupant monitoring ECU 58 may refrain from outputting the instruction to deploy the airbag 21. In other words, the protection ECU 59 may refrain from activating the airbag device 20.

In step ST26, the occupant monitoring ECU 58 may acquire a still image after the collision from the activated interior camera 41 or memory 102. The occupant monitoring ECU 58 may record the acquired still image after the collision on the memory 102 to allow for transmission. The occupant monitoring ECU 58 may return the process to step ST22.

In step ST27 where the collision is a collision with a pedestrian, the occupant monitoring ECU 58 may output an instruction to deploy the airbag 21 for pedestrian protection from the in-vehicle communicator 101 to the in-vehicle network 66. The airbag 21 for pedestrian protection may be located, for example, near a position where the impact is inputted. The protection ECU 59 may acquire, from the in-vehicle network 66, the instruction to deploy the airbag 21 for pedestrian protection, and activate the airbag device 20 for pedestrian protection. This makes it possible to protect a pedestrian or a bicycle from collision with the automobile 1.

In step ST28, instead of acquiring an image from the activated interior camera 41 or memory 102, the occupant monitoring ECU 58 may record information of the collision with the pedestrian on the memory 102 to allow for transmission. The occupant monitoring ECU 58 may return the process to step ST22.

In step ST29, the occupant monitoring ECU 58 may determine whether a predetermined period without collision has passed. The timer 103 may measure the predetermined period without collision from timing of the last collision. In a case where the predetermined period without collision has not passed (ST29: N), the occupant monitoring ECU 58 may return the process to step ST22. In a case where the predetermined period without collision has passed (ST29: Y), the occupant monitoring ECU 58 may advance the process to step ST30.

In step ST30, the occupant monitoring ECU 58 may output, from the in-vehicle communicator 101 to the in-vehicle network 66, images and information that have been recorded to be accumulated on the memory 102 after collisions. The external communication ECU 60 may acquire an image after collision, for example, from the in-vehicle network 66, and transmit the image after collision to the traffic system 80. After consecutive collisions of the automobile 1, the occupant monitoring ECU 58 may attempt to output an image acquired for each collision to the in-vehicle communicator 101 that communicates with the outside of the automobile 1. The occupant monitoring ECU 58 may attempt to transmit vehicle specific information together with the image. By receiving information from the in-vehicle communicator 101, it is possible for the server device 83 and the other automobile 82 of the traffic system 80 to sense a state after collision of the automobile 1. The server device 83 and the other automobile 82 may serve as the other communication devices that communicate with the external communication ECU 60 in the traffic system 80. It is possible for the server device 83 and the other automobile 82 to acquire, after consecutive collisions of the automobile 1, an image or information acquired for each collision as an emergency report. Thereafter, the occupant monitoring ECU 58 may terminate the process in FIG. 5.

Figure 6:
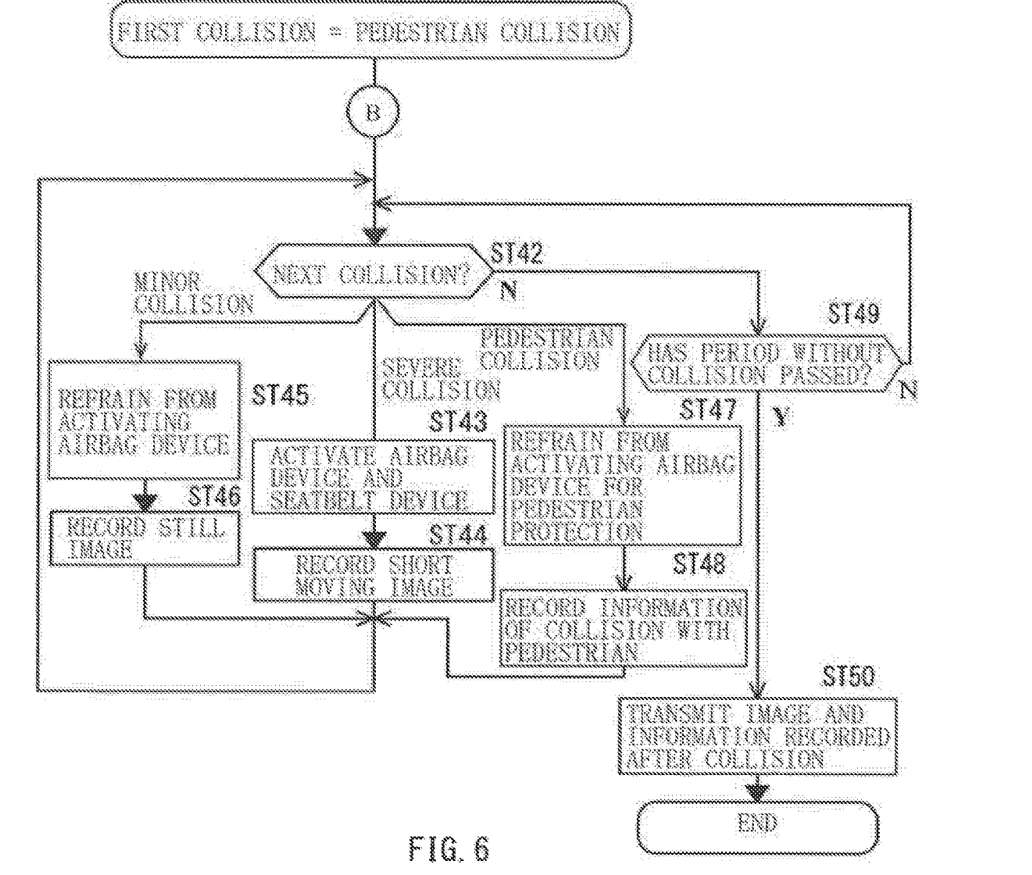
FIG. 6 is a flowchart illustrating a flow of a second or subsequent process upon collision to be performed subsequently to a node B after a first pedestrian collision process illustrated in FIG. 4.

FIG. 6 is a flowchart illustrating a flow of a second or subsequent process upon collision to be performed subsequently to a node B after a first pedestrian collision process illustrated in FIG. 4.

In step ST42 after the first pedestrian collision process, the occupant monitoring ECU 58 may acquire an acceleration that acts on the automobile 1, and determine presence or absence of a second or subsequent collision. In a case where no collision is detected (ST42: N), the occupant monitoring ECU 58 may advance the process to step ST49. In a case where collision is detected, the occupant monitoring ECU 58 may determine a status of the collision on the basis of detection of an acceleration, for example, of the collision. For example, in a case where the acceleration is greater than a collision level determination threshold, the occupant monitoring ECU 58 may determine that the collision is a severe collision, and advance the process to step ST43. In a case where the acceleration is equal to or less than the determination threshold, the occupant monitoring ECU 58 may determine that the collision is a minor collision, and advance the process to step ST45. In a case where a collision with a pedestrian is predictable on the basis of images of the exterior cameras 31 before the collision, the occupant monitoring ECU 58 may determine that the collision is a collision with a pedestrian, and advance the process to step ST47.

In step ST43 where the collision is a severe collision, the occupant monitoring ECU 58 may output an instruction to deploy the airbag 21 from the in-vehicle communicator 101 to the in-vehicle network 66, depending on, for example, an input direction of impact due to the collision and a seating state of the occupant before the collision. The protection ECU 59 may acquire the instruction to deploy the airbag 21 from the in-vehicle network 66, and activate the airbag device 20 and the seatbelt device 10. This enables the airbag device 20 and the seatbelt device 10 to protect the occupant from the assumed collision.

In step ST44, the occupant monitoring ECU 58 may acquire, from the activated interior camera 41 or memory 102, a captured moving image of the occupant in the automobile 1. The occupant monitoring ECU 58 may acquire, from the interior camera 41 or the memory 102, a short moving image within a predetermined time range before and after input timing of the impact. The occupant monitoring ECU 58 may record the acquired short moving image after the collision on the memory 102 to allow for transmission. The occupant monitoring ECU 58 may return the process to step ST42.

In step ST45 where the collision is a minor collision, the occupant monitoring ECU 58 may refrain from outputting the instruction to deploy the airbag 21. In other words, the protection ECU 59 may refrain from activating the airbag device 20.

In step ST46, the occupant monitoring ECU 58 may acquire a still image after the collision from the activated interior camera 41 or memory 102. The occupant monitoring ECU 58 may record the acquired still image after the collision on the memory 102 to allow for transmission. The occupant monitoring ECU 58 may return the process to step ST42.

In step ST47 where the collision is a collision with a pedestrian, the occupant monitoring ECU 58 may refrain from outputting the instruction to deploy the airbag 21 for pedestrian protection. In other words, the protection ECU 59 may refrain from activating the airbag device 20 for pedestrian protection.

In step ST48, instead of acquiring an image from the activated interior camera 41 or memory 102, the occupant monitoring ECU 58 may record information of the collision with the pedestrian on the memory 102 to allow for transmission. The occupant monitoring ECU 58 may return the process to step ST42.

In step ST49, the occupant monitoring ECU 58 may determine whether a predetermined period without collision has passed. The timer 103 may measure the predetermined period without collision from timing of the last collision. In a case where the predetermined period without collision has not passed (ST49: N), the occupant monitoring ECU 58 may return the process to step ST42. In a case where the predetermined period without collision has passed (ST49: Y), the occupant monitoring ECU 58 may advance the process to step ST50.

In step ST50, the occupant monitoring ECU 58 may output, from the in-vehicle communicator 101 to the in-vehicle network 66, images and information that have been recorded to be accumulated on the memory 102 after collisions. The external communication ECU 60 may acquire an image after collision, for example, from the in-vehicle network 66, and transmit the image after collision to the traffic system 80. After consecutive collisions of the automobile 1, the occupant monitoring ECU 58 may attempt to output an image acquired for each collision to the in-vehicle communicator 101 that communicates with the outside of the automobile 1. The occupant monitoring ECU 58 may attempt to transmit vehicle specific information together with the image. By receiving information from the in-vehicle communicator 101, it is possible for the server device 83 and the other automobile 82 of the traffic system 80 to sense a state after collision of the automobile 1. The server device 83 and the other automobile 82 may serve as the other communication devices that communicate with the external communication ECU 60 in the traffic system 80. It is possible for the server device 83 and the other automobile 82 to acquire, after consecutive collisions of the automobile 1, an image or information acquired for each collision as an emergency report. Thereafter, the occupant monitoring ECU 58 may terminate the process in FIG. 6.

In this manner, for consecutive collisions, the occupant monitoring ECU 58 may record a moving image, a still image, or collision information on the memory 102, depending on a status of each collision. For example, each time a minor collision is detected out of the consecutive collisions, the occupant monitoring ECU 58 may repeatedly record, as an image, a still image on the memory 102 to allow for transmission. In a case where a collision with a pedestrian is detected out of the consecutive collisions, the occupant monitoring ECU 58 may record, in place of an image, information of the collision with the pedestrian on the memory 102.

As described above, in the example embodiment, each time a minor collision is detected out of consecutive collisions, the occupant monitoring ECU 58 may repeatedly record a still image on the memory 102 to allow for transmission. Thus, for consecutive collisions whose duration is unknown, it is possible to appropriately record still images during the collisions on the memory 102 to allow for transmission. Moreover, for a minor collision that is assumed not to cause great deformation of the automobile 1, a still image may be recorded instead of a moving image, which makes it possible to reduce recording load of the memory 102 and image transmission load.

In the example embodiment, in a case where a collision with a pedestrian is detected out of the consecutive collisions, information of the collision with the pedestrian may be repeatedly recorded, in place of an image, on the memory 102. In a case of a collision with a pedestrian, it is assumed that deformation of the body of the automobile 1 is less likely to have influence on the occupant. Thus, for a collision with a pedestrian, information of the collision with the pedestrian may be recorded instead of an image, which makes it possible to reduce the recording load of the memory 102 and the image transmission load.

Accordingly, in the example embodiment, it is possible to know what kinds of collisions have occurred consecutively, depending on statuses of consecutive records recorded or transmitted for the collisions. In checking recorded or transmitted images, switching of the record status, for example, makes it possible to intuitively know what kinds of collisions have occurred consecutively.

Third Example Embodiment

Now, the traffic system 80 according to a third example embodiment of the technology will be described. In the example embodiment, an attempt may be made to transmit images accumulated during collisions, for example, in response to a transmission request after a process upon collision. The following description mainly describes differences from the first and second example embodiments described above. In the third example embodiment, elements that are similar to those in the first and second example embodiments described above are denoted with the same numerals to avoid any redundant description.

Figure 7:
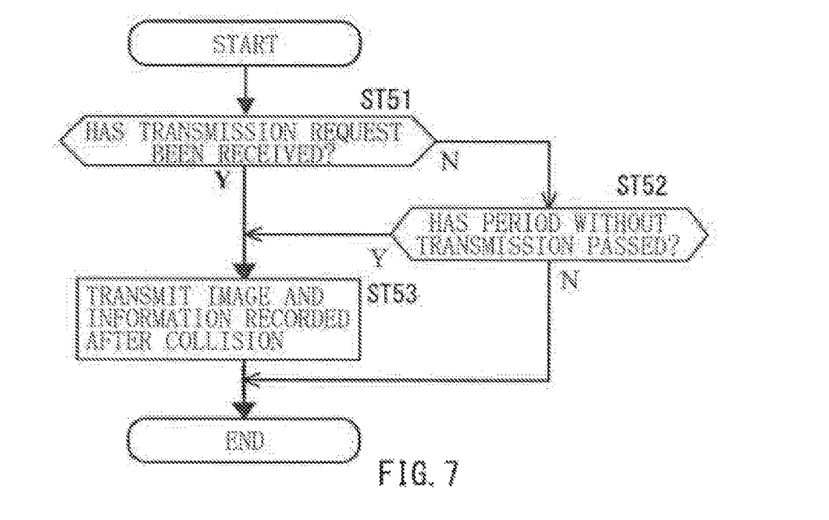
FIG. 7 is a flowchart illustrating a flow of a transmission process to be performed by an occupant monitoring ECU after a process upon collision in a traffic system according to one example embodiment of the technology.

FIG. 7 is a flowchart illustrating a flow of a transmission process to be performed by the occupant monitoring ECU 58 after a process upon collision in the traffic system 80 according to the third example embodiment of the technology.

After a process upon collision illustrated in FIG. 4, for example, the occupant monitoring ECU 58 may repeatedly perform a process illustrated in FIG. 7. In a case where an accident is reported, for example, the server device 83 of the traffic system 80 may repeatedly transmit a transmission request to the automobile 1 involved in the accident, via the communication base station 81 or the other automobile 82, to collect accident information.

In step ST51, the occupant monitoring ECU 58 may determine whether a transmission request has been received. For example, the occupant monitoring ECU 58 may determine whether the external communication ECU 60 or the extra-vehicle emergency communicator 107 has received a transmission request from the traffic system 80. In a case where no transmission request has been received (ST51: N), the occupant monitoring ECU 58 may advance the process to step ST52. In a case where a transmission request has been received (ST51: Y), the occupant monitoring ECU 58 may advance the process to step ST53.

In step ST52, the occupant monitoring ECU 58 may determine whether a predetermined period without transmission has passed. The timer 103 may measure the predetermined period without transmission from timing of the last transmission. In a case where the predetermined period without transmission has not passed (ST52: N), the occupant monitoring ECU 58 may terminate the process in FIG. 7. In a case where the predetermined period without transmission has passed (ST52: Y), the occupant monitoring ECU 58 may advance the process to step ST53.

In step ST53, the occupant monitoring ECU 58 may output, from the in-vehicle communicator 101 to the in-vehicle network 66, images and information that have been recorded to be accumulated on the memory 102 after collisions. The external communication ECU 60 may acquire an image after collision, for example, from the in-vehicle network 66, and transmit the image after collision to the traffic system 80. After consecutive collisions of the automobile 1, the occupant monitoring ECU 58 may attempt to output an image acquired for each collision to the in-vehicle communicator 101 that communicates with the outside of the automobile 1. Alternatively, the occupant monitoring ECU 58 may transmit, from the extra-vehicle emergency communicator 107, images and information that have been recorded to be accumulated on the memory 102 after collisions. The occupant monitoring ECU 58 may attempt to transmit vehicle specific information together with the images. Thereafter, the occupant monitoring ECU 58 may terminate the process in FIG. 7.

The server device 83 and the other automobile 82 may serve as the other communication devices that communicate with the external communication ECU 60 in the traffic system 80. It is possible for the server device 83 and the other automobile 82 to acquire, after consecutive collisions of the automobile 1, an image or information acquired for each collision as an emergency report.

As described above, in the example embodiment, the occupant monitoring ECU 58 may attempt to output an image acquired for each collision to the in-vehicle communicator 101 that communicates with the outside of the automobile 1, in response to a transmission request after consecutive collisions of the automobile 1. In addition, after the consecutive collisions of the automobile 1, the occupant monitoring ECU 58 may attempt to output, for each predetermined period, the image acquired for each collision to the in-vehicle communicator 101 that communicates with the outside of the automobile 1. Thus, the other communication device that has outputted the transmission request is able to acquire, by communication, a state of the occupant in the automobile 1 after the consecutive collisions.

Although some example embodiments of the technology have been described in the foregoing, the technology is by no means limited to the example embodiments. Various changes and modifications may be made to any embodiment without departing from the scope of the technology.

For example, in the foregoing example embodiments, the occupant monitoring ECU 58 may collectively transmit images, for example, about consecutive collisions after it is determined that the consecutive collisions no longer occur.

In another example, the occupant monitoring ECU 58 may individually transmit images, for example, about the consecutive collisions, after each collision. In this case, the occupant monitoring ECU 58 may individually transmit an image, for example, about the previous collision after a collision is detected next, for example.

In still another example, before a first collision out of the consecutive collisions occurs, the occupant monitoring ECU 58 may transmit, beforehand, vehicle specific information or a captured image of the occupant on the basis of the collision prediction in step ST3, for example.

Comparative Example

A vehicle may use an occupant monitoring device to monitor an occupant upon collision and report an emergency to a traffic system, as in Japanese Unexamined Patent Application Publication No. 2004-291761. In this case, the vehicle is able to transmit, as the emergency report, occupant monitoring information acquired upon collision by the occupant monitoring device, without additionally including a reporting device dedicated for emergency reporting. It is possible to use the occupant monitoring device provided in the vehicle for occupant rescue, for example.

However, collision of the vehicle can occur more than once. The vehicle involved in a collision can further collide with another vehicle, for example.

In such a situation, in a case where the occupant monitoring device is configured to perform monitoring and reporting on the basis of first collision detection, for example, the occupant monitoring device can be unable to appropriately monitor and report a change in state of the occupant due to subsequent collisions.

It is desirable to allow, upon collision, the occupant monitoring device to appropriately monitor an occupant even if the collision includes a plurality of collisions.

In contrast, in the foregoing example embodiments, upon collision, the occupant monitoring device is able to appropriately monitor an occupant even if the collision includes a plurality of collisions. In the foregoing example embodiments, the controller of the occupant monitoring device for the vehicle may detect consecutive collisions of the vehicle, for each collision. The controller may acquire an image after each collision by the image acquisition unit, and record the image acquired for each collision on the memory. After the consecutive collisions of the vehicle, the controller may attempt to output the image acquired for each collision to the communicator that communicates with the outside of the vehicle. Thus, in the foregoing example embodiments, after the collisions, images recorded on the memory 102 or transmitted images may be used for occupant rescue, for example. For example, in the foregoing example embodiments, for consecutive collisions of the vehicle, an image after each collision may be recorded, making it possible to know a change in state of the occupant due to the consecutive collisions. In addition, the controller may record a still image before the first collision, making it possible to also know a state of the occupant before collision. This makes it possible to appropriately know a change in state of the occupant due to subsequent collisions. In a case where consecutive collisions have occurred among a plurality of vehicles, it is possible to know a change in state of the occupant in each of the vehicles. Thus, even for an occupant suffering combined damage due to the consecutive collisions, it is possible for a state of the occupant to be known more accurately and used for rescue of a plurality of occupants, for example.

The occupant monitoring device 40 illustrated in FIG. 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the occupant monitoring device 40. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the occupant monitoring device 40 illustrated in FIG. 3.

Although the technology is described hereinabove in terms of example embodiments, it is not limited thereto. It should be appreciated that variations may be made in the described example embodiments by persons skilled in the art without departing from the scope of the technology as defined by the following claims. The limitations in the claims are to be interpreted broadly based on the language employed in the claims and not limited to examples described in this specification or during the prosecution of the application, and the examples are to be construed as non-exclusive. For example, in this technology, the use of the terms first, second, etc. do not denote any order or importance, but rather the terms first, second, etc. are used to distinguish one element from another. The term "disposed on/provided on/formed on" and its variants as used herein refer to elements disposed directly in contact with each other or indirectly by having intervening structures therebetween. Moreover, no element or component in this technology is intended to be dedicated to the public regardless of whether the element or component is explicitly recited in the following claims.

The invention claimed is:

1. An occupant monitoring device for a vehicle, the occupant monitoring device comprising:
   a first camera configured to acquire a captured image of an occupant in the vehicle;
   a memory configured to record the captured image acquired by the first camera;
   a collision detector configured to detect collision of the vehicle; and
   a controller configured to control the first camera, the memory, and the collision detector, the controller being configured to
      detect each of consecutive collisions of the vehicle by the collision detector,
      acquire the captured image after each of the collisions by the first camera, and
      record the captured image acquired for each of the collisions on the memory.

2. The occupant monitoring device for the vehicle, according to claim 1, wherein the controller is configured to, after the consecutive collisions of the vehicle, output the captured image acquired for each of the collisions to a communicator configured to communicate with an outside of the vehicle.

3. The occupant monitoring device for the vehicle, according to claim 2, wherein the controller is configured to record, as the captured image, a still image on the memory, the still image being acquired by the first camera before a first collision out of the consecutive collisions.

4. The occupant monitoring device for the vehicle, according to claim 2, wherein the controller is configured to
   determine a collision severity depending on collision prediction on a basis of image captured by a second camera installed, in the vehicle, configured to provide to monitor directions such as a travelling direction of the vehicle and the collision detection that are performed by the collision detector, and
   record, as the captured image, a still image or a moving image acquired by the first camera on the memory, depending on the determined collision severity.

5. The occupant monitoring device for the vehicle, according to claim 4, wherein the controller is configured to,
   at a first collision out of the consecutive collisions, record, as the captured image, a moving image or a still image acquired by the first camera on the memory, or record collision information on the memory, depending on the collision severity status, and
   at a second collision out of the consecutive collisions, record, as the captured image, a moving image acquired by the first camera on the memory, regardless of the collision severity.

6. The occupant monitoring device for the vehicle, according to claim 2, wherein, for the consecutive collisions, the controller is configured to record, as the captured image, a moving image or a still image acquired by the first camera on the memory, or record collision information on the memory, depending on a severity of each of the collisions.

7. The occupant monitoring device for the vehicle, according to claim 2, wherein the controller is configured to output the captured image acquired for each collision to a communicator configured to communicate with an outside of the vehicle, in response to a transmission request after the consecutive collisions of the vehicle, or for each predetermined period.

8. The occupant monitoring device for the vehicle, according to claim 1, wherein the controller is configured to record, as the captured image, a still image on the memory, the still image being acquired by the first camera before a first collision out of the consecutive collisions.

9. The occupant monitoring device for the vehicle, according to claim 1, wherein the controller is configured to
   determine a collision severity depending on collision prediction on a basis of image captured by a second camera installed, in the vehicle, configured to provide to monitor directions such as a travelling direction of the vehicle and the collision detection that are performed by the collision detector, and
   record, as the captured image, a still image or a moving image acquired by the first camera on the memory, depending on the determined collision severity.

10. The occupant monitoring device for the vehicle, according to claim 9, wherein, when the collision detector detects a severe collision out of the consecutive collisions, the controller is configured to record, as the captured image, the moving image in a predetermined period on the memory.

11. The occupant monitoring device for the vehicle, according to claim 10, wherein, when the collision detector detects a minor collision out of the consecutive collisions, the controller is configured to record, as the captured image, the still image on the memory.

12. The occupant monitoring device for the vehicle, according to claim 10, wherein
    when the collision detector detects a collision with a pedestrian out of the consecutive collisions by using image captured by the second camera, the controller is configured to record, in place of the captured image, information of the collision with the pedestrian on the memory.

13. The occupant monitoring device for the vehicle, according to claim 9, wherein, when the collision detector detects a minor collision out of the consecutive collisions, the controller is configured to record, as the captured image, the still image on the memory.

14. The occupant monitoring device for the vehicle, according to claim 9, wherein,
    when the collision detector detects a collision with a pedestrian out of the consecutive collisions by using image captured by the second camera, the controller is configured to record, in place of the captured image, information of the collision with the pedestrian on the memory.

15. The occupant monitoring device for the vehicle, according to claim 9, wherein the controller is configured to,
    at a first collision out of the consecutive collisions, record, as the captured image, a moving image or a still image acquired by the first camera on the memory, or record collision information on the memory, depending on the collision severity, and
    at a second collision out of the consecutive collisions, record, as the captured image, a moving image acquired by the first camera on the memory, regardless of the collision severity.

16. The occupant monitoring device for the vehicle, according to claim 1, wherein, for the consecutive collisions, the controller is configured to record, as the captured image, a moving image or a still image acquired by the first camera on the memory, or record collision information on the memory, depending on a severity of each of the collisions.

17. The occupant monitoring device for the vehicle, according to claim 1, wherein the controller is configured to output the captured image acquired for each collision to a communicator configured to communicate with an outside of the vehicle, in response to a transmission request after the consecutive collisions of the vehicle, or for each predetermined period.

18. A traffic system comprising:
the occupant monitoring device for the vehicle, according to claim 1; and
a communication device configured to communicate with the occupant monitoring device,
the occupant monitoring device being configured to transmit, after the consecutive collisions of the vehicle, the captured image acquired for each of the collisions to the communication device.

19. A traffic system comprising:
the occupant monitoring device for the vehicle, according to claim 2; and
a communication device configured to communicate with the occupant monitoring device,
the occupant monitoring device being configured to transmit, after the consecutive collisions of the vehicle, the captured image acquired for each of the collisions to the communication device.

* * * * *